United States Patent [19]

Okonowitz

[11] 4,134,420
[45] Jan. 16, 1979

[54] FAUCET VALVE FOR SINKS, WASH BASINS AND OTHER APPLICATIONS

[75] Inventor: Hyman Okonowitz, Selden, N.Y.

[73] Assignee: Jameco Industries, Inc., Wyandanch, N.Y.

[21] Appl. No.: 805,882

[22] Filed: Jun. 13, 1977

[51] Int. Cl.² ............................................. F16K 43/00
[52] U.S. Cl. ...................................... 137/315; 251/86; 251/223; 251/225; 251/265
[58] Field of Search ................. 215/220, 330; 251/84, 251/85, 86, 215, 218, 219, 221, 223, 225, 230, 366, 367, 251, 266, 265; 137/315

[56] References Cited

U.S. PATENT DOCUMENTS

| 1,795,839 | 3/1931 | Credle | 251/266 |
| 2,622,839 | 12/1952 | Wagner | 251/223 |
| 2,796,079 | 6/1957 | Hugg | 137/315 |
| 2,973,179 | 2/1961 | Kleinschmidt et al. | 251/86 |
| 2,980,275 | 4/1961 | Lundgren | 215/330 |
| 3,904,169 | 9/1975 | Cohn et al. | 251/86 |
| 3,905,509 | 9/1975 | Markowitz | 215/330 |
| 3,917,218 | 11/1975 | Marocco | 251/367 |
| 3,929,317 | 12/1975 | Cohn et al. | 251/288 |
| 3,977,557 | 8/1976 | Hazard | 215/330 |

FOREIGN PATENT DOCUMENTS

| 106092 | 2/1965 | Norway | 215/330 |
| 320403 | 10/1929 | United Kingdom | 251/86 |

Primary Examiner—Martin P. Schwadron
Assistant Examiner—G. L. Walton
Attorney, Agent, or Firm—Stoll and Stoll

[57] ABSTRACT

A faucet valve for kitchen sinks, bathroom washbasins and like applications, said faucet valve being adapted to be made of molded plastics, having relatively few operative parts, and designed to minimize the stresses of assembly and use. The invention has two principal features: the first is the use of a ratchet interlock between the bonnet of the valve and the cover plate of the sink or washbasin, said interlock being oriented to allow the bonnet to be rotated in one direction relative to the valve body in order to thread the bonnet into engagement with the valve body, and to prevent the bonnet from rotating in the opposite direction relative to the valve body when the valve is in use; and the second is the use of a self-centering valve closure member in the form of a spherical ball mounted within a spherical socket with sufficient clearance between them to enable the ball to float relative to the valve seat.

3 Claims, 19 Drawing Figures

U.S. Patent  Jan. 16, 1979  4,134,420
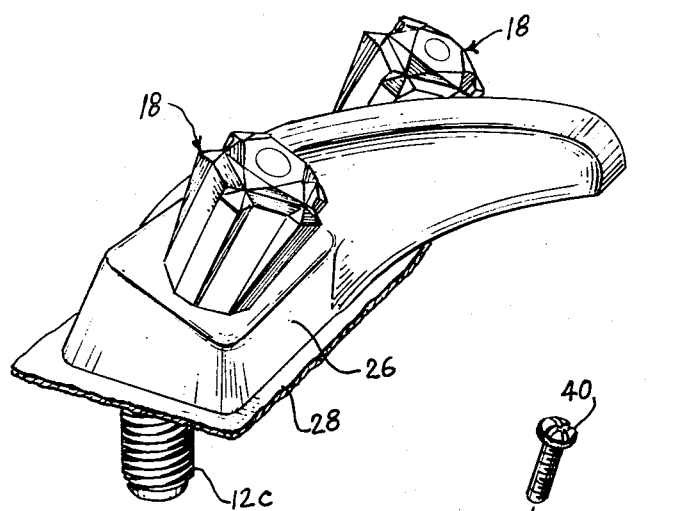
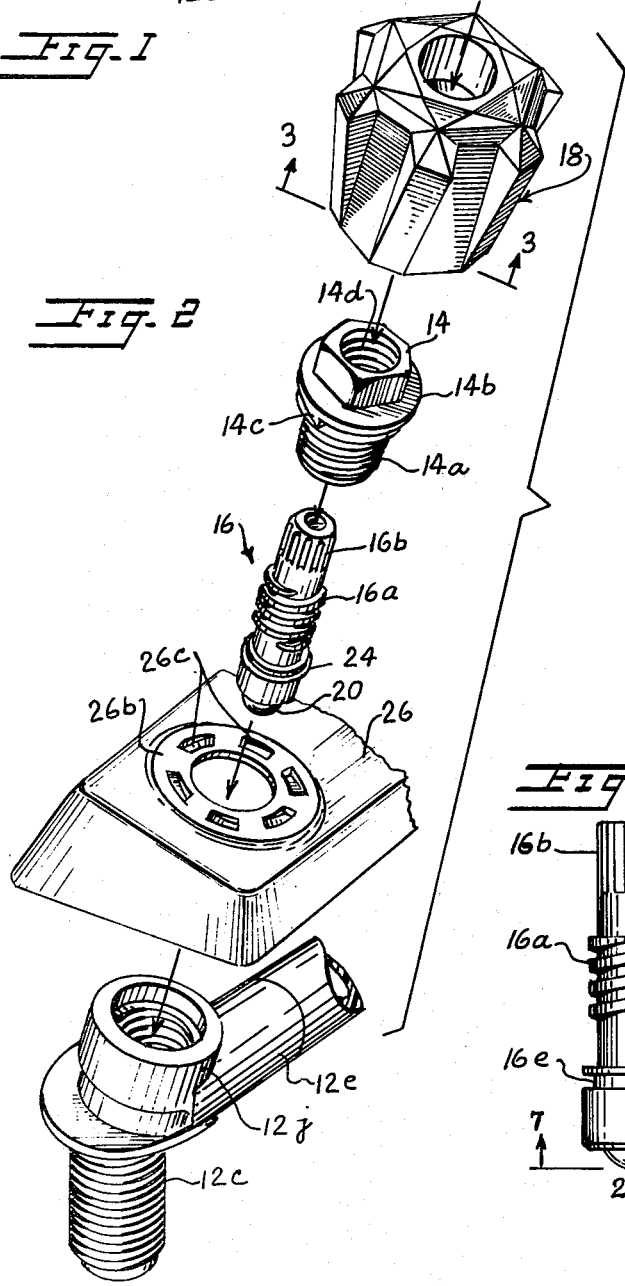
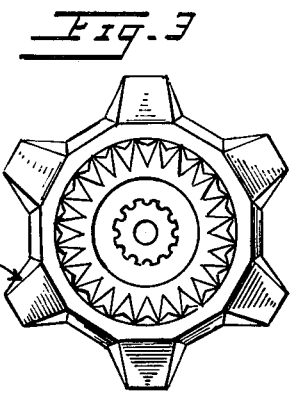
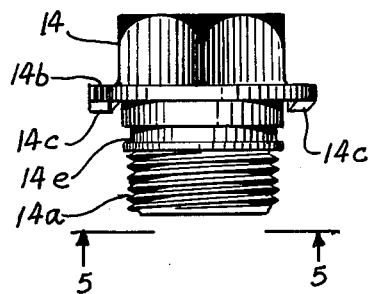
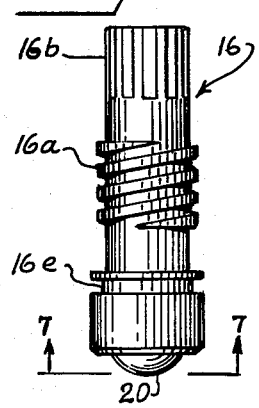

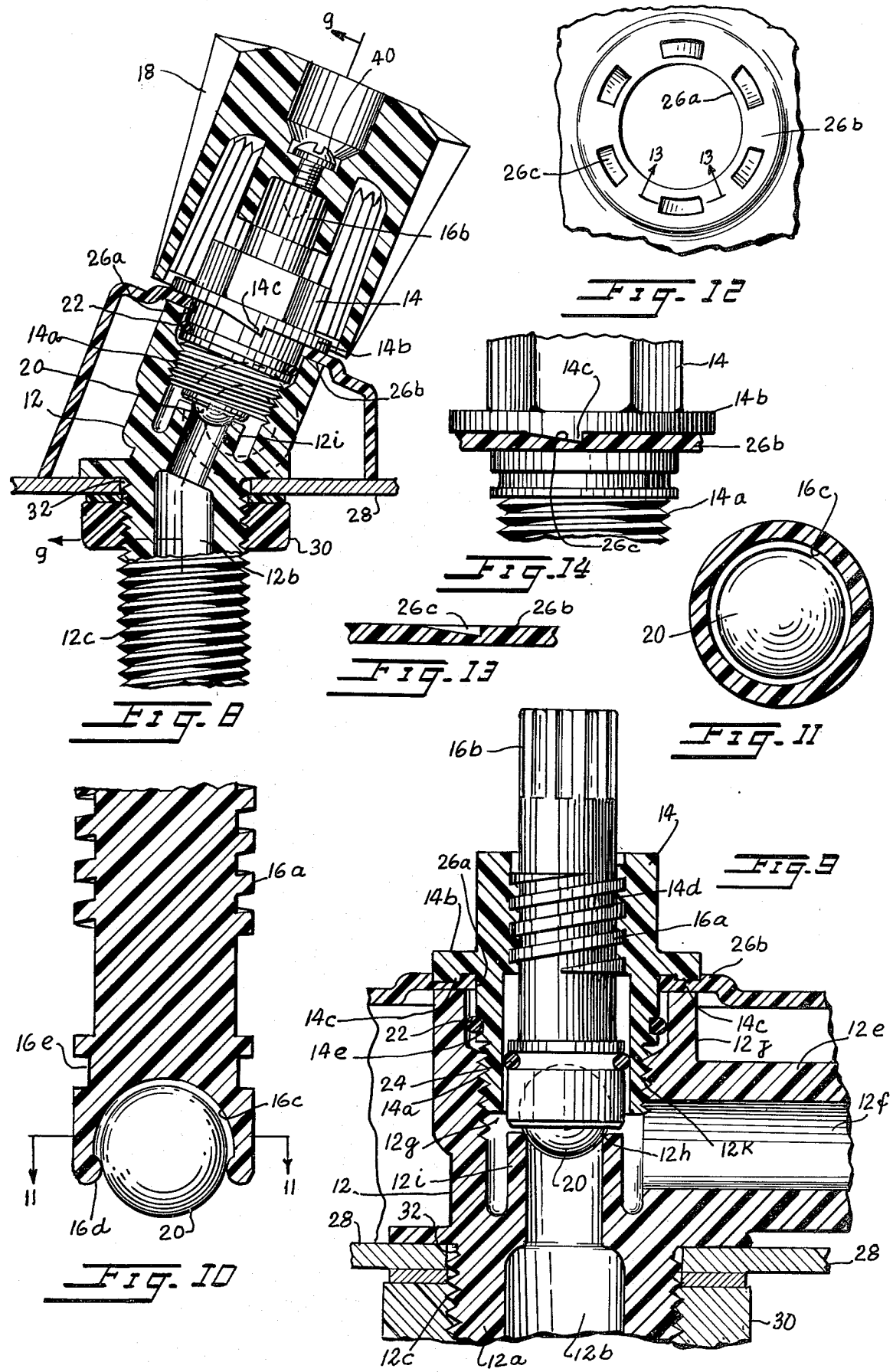

4,134,420

FAUCET VALVE FOR SINKS, WASH BASINS AND OTHER APPLICATIONS

BACKGROUND OF THE INVENTION

1. Field of the Invention

This invention relates to faucet valves for domestic and commercial use, said faucet valves being adapted for installation in kitchen sinks, bathroom washbasins and other lavatories. It is particularly adapted for inexpensive replacement use by homeowners and others who are not professional plumbers.

2. Description of the Prior Art

The closest prior patent art known to applicant consists of the following U.S. Pat. Nos.: Cohen, et al 3,904,169, Sept. 9, 1975; Cohen, et al 3,929,317, Dec. 30, 1975.

These patents disclose faucet valves which are adapted to be made of molded plastics. However, they differ in design and construction from the faucet valve which is herein described and claimed. Specifically, Pat. No. 3,904,169 discloses no positive means for locking the bonnet against rotation relative to the valve body. In this patent the bonnet is simply screwed into the valve body and the clamping action between these screw threaded parts is the means for locking them against relative movement. This is the system which is conventionally used to lock metal bonnets in place in metal valve bodies. The system functions well in the environment of metal parts; it does not function well with plastic parts since they are not suited to the stresses of this form of clamping action. It is believed that this patent is not in commercial use.

To cure this deficiency in U.S. Pat. Nos. 3,904,169, the same applicants devised the system which is disclosed in 3,929,317. In the latter patent, which is in commercial use, a retainer element is provided between the bonnet and the cover plate, and this retainer element is locked by splines to the bonnet and by tabs to both the bonnet and the cover plate. It is this interlocking retainer element which is not found in U.S. Pat. No. 3,904,169; but by the same token it is not found in the valve construction which is herein disclosed and claimed.

SUMMARY OF THE INVENTION

The present invention provides positive interlocking means between the bonnet and the cover plate without the interposition of a retainer element such as is shown in U.S. Pat. No. 3,929,317. Briefly stated, applicant provides ratchet-shaped teeth on the bonnet and ratchet shaped sockets in the cover plate. This arrangement makes it possible to rotate the bonnet into screw threaded engagement with the valve body but it prevents the bonnet from rotating in the opposite direction. Consequently, the interlocking relationship between the ratchet teeth on the bonnet and the ratchet sockets on the cover plate provides a very simple and effective method of locking the bonnet against rotation. This method of interlocking the bonnet with the cover plate is possible only because the parts, and particularly the bonnet, are molded of relatively resilient plastics. Corresponding parts made of metal would lack the resilience necessary to enter into the interlocking relationship above described.

In short, the present invention achieves a rotationally, locked bonnet without the need of an interlocking retainer element of the type disclosed in U.S. Pat. No. 3,929,317.

Another important feature of the present invention which is not found in the above cited prior art resides in the use of a ball valve. These prior patents disclose different forms of valve closure members, for example, U.S. Pat. No. 3,904,169 shows three forms of valve closure members. None, however, provide the features and advantages of a ball shaped valve closure member operating in conjunction with a plastic molded holder (the stem) and a plastic molded valve seat (in the valve body). For example, the cited patents require two sealing rings, one between the valve closure member and the bonnet, and the other between the bonnet and the valve body. In the commercial embodiment of U.S. Pat. No. 3,929,317, a third washer is provided between the valve closure member and the valve seat.

In the present invention, sealing rings are also provided. One is disposed between the bonnet and the valve body. However, the other sealing ring is disposed not between the ball shaped closure member and the bonnet, but between the valve stem and the bonnet. The ball shaped closure member remains free to rotate and to locate its most effective sealing position on the valve seat.

DESCRIPTION OF THE DRAWING

FIG. 1 is a perspective view of a multivalve faucet which embodies the principles of this invention.

FIG. 2 is a perspective exploded view of the several components of one of the valves of said faucet.

FIG. 3 is a top view of the handle shown in FIG. 2.

FIG. 4 is a side view of the bonnet shown in FIG. 2.

FIG. 5 is a bottom view of said bonnet looking in the direction of arrows 5,5 of FIG. 4.

FIG. 6 is a side view of the valve stem shown in FIG. 2.

FIG. 7 is a bottom view thereof looking in the direction of arrows 7,7 of FIG. 6.

FIG. 8 is an enlarged, fragmentary, partly sectional view showing the components of FIG. 2 in assembled form.

FIG. 9 is an enlarged, fragmentary, sectional view taken on the line 9—9 of FIG. 8.

FIG. 10. is an enlarged, fragmentary section through the valve stem.

FIG. 11 is a section therethrough taken on the line 11—11 of FIG. 10.

FIG. 12 is a fragmentary plan view of the cover plate, showing the hole through which one of the valves extends.

FIG. 13 is a fragmentary section on the line 13—13 of FIG. 12.

FIG. 14 is an enlarged, fragmentary, partly sectional side view showing the ratchet interlock between the bonnet and the cover plate.

DESCRIPTION OF PREFERRED EMBODIMENT OF THE INVENTION

Figure 15:
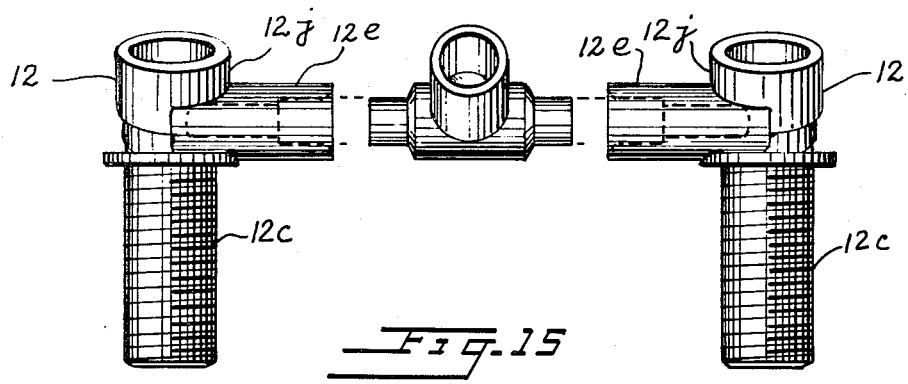
FIG. 15 is a view of the multi-valve faucet shown in FIG. 1, the cover plate being removed to expose the valve housings.
Figure 16:
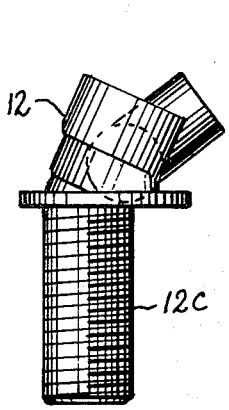
FIG. 16 is a side view of one of the valve housings shown in FIG. 15.
Figure 17:
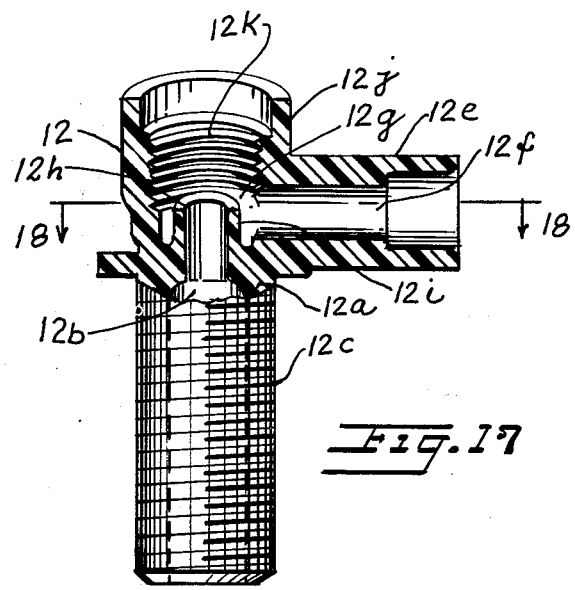
FIG. 17 is an enlarged view, partly broken away and in section, of said valve housing.
Figure 18:
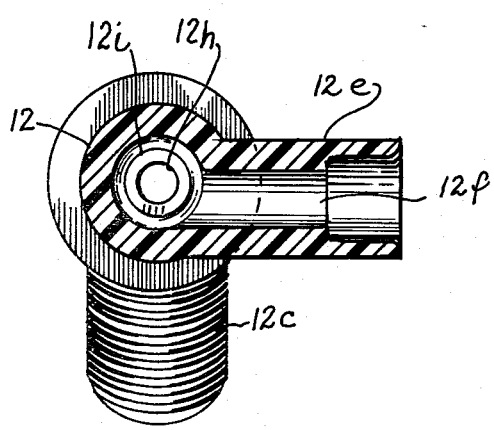
FIG. 18 is a sectional view on the line 18—18 of FIG. 17.
Figure 19:
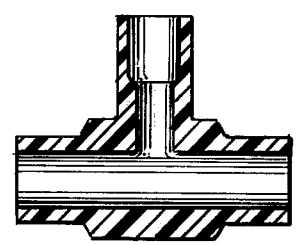
FIG. 19 is a sectional view of the connector between the two valve housings shown in FIG. 15.

Faucet 10 shown in FIG. 1 of the drawing is a bathroom washbasin faucet embodying the principles and construction of the present invention. The valve parts proper, shown, for example, in FIG. 2, are equally applicable to other faucets, for example faucets used in kitchen sinks. Consequently a description of the invention as applied to bathroom faucet 10 is equally applicable to other faucets used in other installations.

More particularly, the invention comprises a valve construction which is best shown in FIG. 9. Essentially, the valve construction comprises a valve body 12, a bonnet 14, a valve stem 16 with a handle 18 thereon, a valve closure member 20, a first sealing ring 22 between the bonnet and the valve body, a second sealing ring 24 between the valve stem and the bonnet, and the cover plate 26 of washbasin 28. The cover plate is included in the valve construction since it is an integral part of the locking means for preventing unintended rotation of the bonnet.

With specific reference to FIG. 9 it will be observed that valve body 12 has a downwardly extending pipe section 12a defining the inlet port 12b. External screw threads 12c are formed on said pipe section 12a to receive a retaining nut 30. As is conventional, pipe section 12a projects through a hole 32 formed in the wall of washbasin 28, and flange 12d of the valve body, immediately above said pipe section 12a, abuts the washbasin wall. On the opposite side of the washbasin wall from flange 12d is the retaining nut 30 which is screwed onto pipe section 12a to clamp the valve body in place. Extending laterally from the valve body is a tubular extension 12e and it will be understood that this tubular extension defines outlet port 12f. This tubular outlet extension communicates through the valve body with the inlet port in pipe section 12a and it also communicates with the faucet nozzle 10a in conventional manner. Extending upwardly from inlet port 12b is a valve chamber 12g in which the valve closure element 20 in disposed and through which communication is provided between said inlet and outlet ports.

Valve seat 12h is formed on a tubular section 12i which extends upwardly into the valve chamber from pipe section 12a. Another tubular section 12j is formed on the valve body, extending upwardly in coaxial relation to the tubular section 12i and valve seat 12h. Tubular section 12j is provided with internal screw threads 12k and it will be observed that the bonnet 14 is screwed into said threaded portion of tubular section 12j. More precisely, bonnet 14 is provided with external screw threads 14a which engage internal screw threads 12k of the valve body to secure the bonnet to the valve body. The screw threaded engagement of the bonnet with the valve body does not, however, preclude unintentional reverse rotation of the bonnet relative to the valve body. Such unintentional reverse rotation is prevented by the locking means which will now be described.

As is conventional, bonnet 14 projects through an opening 26a in cover plate 26. As FIG. 9 clearly shows, the peripheral flange 26b of cover plate 26 which defines and encircles opening 26a is clamped between an annular flange 14b on the bonnet and the top of tubular section 12j of the valve body. It will also be observed (for example in FIG. 14) that ratchet shaped teeth 14c are formed on the downwardly facing surface of annular flange 14b of the bonnet. It will also be seen (for example, in FIGS. 12 and 14) that ratchet shaped sockets 26c are formed in the upwardly facing surface of said peripheral flange 26b. Ratchet shaped sockets 26c are shaped, dimensioned and located to complement and correspond to the shape, dimensions and relative locations of ratchet teeth 14c. Consequently, when bonnet 14 is threaded into the internally threaded section of tubular extension 12j of the valve body, ratchet teeth 14c will cam their way across the ratchet shaped sockets 26c until the bonnet becomes tightly engaged with the valve body and the ratchet teeth snap into and become firmly embedded in the ratchet shaped sockets. At this point, the bonnet is firmly clamped against the cover plate which, in turn, is firmly clamped against the valve body, so that further entry of the bonnet into the valve body is precluded. Annular flange 14b of the bonnet is seated on annular flange 26b of the cover plate and, as shown in FIG. 9, the ratchet-shaped sockets 26c are recessed sufficiently to receive ratchet teeth 14c without disturbing the seating of the annular flange of the bonnet on the annular flange of the cover plate. Also precluded would be further rotation of the bonnet in the direction in which it was screwed into the valve body. Rotation of the bonnet in the opposite direction is precluded by the ratchet teeth engaging the ratchet shaped sockets.

The importance of the materials of which the foregoing parts are made will now become apparent. Specifically, the bonnet, the valve body and the cover plate are made of molded plastics. The plastic material must be sufficiently strong and rigid to enable the valve to maintain its structural integrity. On the other hand, the plastics must be sufficiently resilient to enable the ratchet teeth to cam and slide over the ratchet shaped sockets while the bonnet is being threaded into the valve body. When the bonnet is tightly screwed into the valve body and the ratchet teeth are tightly engaged with the ratchet shaped sockets, the plastic material is of sufficient strength and rigidity to prevent the ratchet teeth from disengaging the ratchet shaped sockets, thereby preventing the bonnet from rotating relative to the valve body when the valve is in use. In this connection it will be understood that the cover plate is itself fixed against rotational movement relative to the sink or basin on which it is mounted and relative to the valve body or valve bodies which it encloses. For example, FIG. 1 shows a faucet structure wherein there are two valves, one controlling the flow of cold water and the other controlling the flow of hot water, both valves being enclosed by a single cover plate. The cover plate is secured to the sink or washbasin by conventional means and is clearly fixed against rotational movement relative to either of the valves and relative to the sink or washbasin on which it is mounted. Consequently, when the bonnet is prevented by its ratchet interlock with the cover plate from engaging in rotational movement relative to the cover plate, that is sufficient to fix the bonnet against rotational movement relative to the valve body.

Among the materials suited for molding the several parts of the valve hereinabove mentioned are the following: Celcon, a product of Celanese Corporation of America, this material being an acetal copolymer of ethyl cellulose thermoplastic, and Delrin, and acetal resin produced by E. I. duPont de Nemours and Company. The cover plate may be made of a less rigid material such as acrylonitrile-butadiene-styrene copolymers, commonly known as ABS.

Turning our attention now to the valve stem 16, the valve closure member 20 and the valve seat 12h, it will be observed that the valve stem is provided with conventional external screw threads 16a for engagement with complementary internal screw threads 14d formed in bonnet 14. As the drawing clearly shows (see FIGS. 9 and 10) these threads are square to conform to convention. At the upper end of stem 16 is a plurality of longitudinally extending splines 16b which are adapted to engage complementary splines 18a formed in handle 18. Splining the handle to the stem prevents relative rotational movement between them. A screw 40 extending through the handle coaxially therewith engages the valve stem and prevents dislodgment of the handle from the stem.

Valve closure member 20 is housed within the lower end of the valve stem. Specifically, a spherical socket 16c is formed within the lower end of the valve stem to accommodate the valve closure member 20 which is a spherical ball. As is clearly shown in FIGS. 10 and 11, the radius of curvature of socket 16c exceeds the radius of curvature of valve closure ball 20 sufficiently to enable the ball to float relative to the valve stem. The spherical socket 16c is open at the bottom to allow the valve closure ball to project outwardly from the socket for engagement with the valve seat. An annular bead 16d is formed at the mouth of the socket opening to prevent accidental dislodgement of the valve ball from the socket.

It will be observed that there are no washers or other forms of seal between the valve ball and the valve stem. It will also be observed that there are no washers or other sealing elements between the valve ball and the valve seat. The ball engages the seat directly and if there should happen to be any misalignment between the valve stem and the valve seat, the floating action of the valve ball will automatically compensate for such misalignment and the ball will automatically center and seat itself with respect to the valve seat. The valve ball may also be made of plastics, e.g., the plastics hereinabove mentioned which are sold under the trademarks Celcon and Delrin. However, if desired, the valve ball may be made of metal, e.g., stainless steel.

Although washers are not required between the valve ball and the valve seat, or between the valve ball and the valve stem, washers should be used between the bonnet and the valve body, and between the bonnet and the valve stem. Thus, washer 22, e.g., a rubber O-ring, is placed within an annular groove 14e formed in the bonnet for engagement with the inner wall of tubular section 12j of the valve body. Washer 24, e.g., a rubber O-ring, is mounted within an annular groove 16e formed in the valve stem for engagement with the inner wall of the bonnet.

The foregoing is illustrative of the invention and is subject to all necessary or desirable design variations which are encompassed within the scope of the appended claims. For example, the invention is not limited to the precise form of multi-valve faucet and installation shown in the drawing. It is applicable to other conventional multi-valve and single valve faucets and installations commonly used in the home and in other applications.

I claim:

1. A faucet valve for sinks, wash basins and other applications wherein the valve is mounted between a sink or basin wall and a fixed cover plate, said wall and cover plate having registering openings to accommodate the valve, said valve comprising:
   a. a hollow valve body extending through the opening in the sink or basin wall,
   b. said valve body having both internal and external screw threads,
   c. a nut engaging the external screw threads on the valve body and securing said valve body to the sink or basin wall,
   d. a hollow bonnet extending through the registering opening in the cover plate,
   e. said bonnet having both internal and external screw threads,
   f. the external screw threads of the bonnet engaging the internal screw threads of the valve body to secure the bonnet to the valve body,
   g. an externally threaded valve stem threaded to the internal screw threads of the bonnet and extending into the valve body,
   h. a valve seat in the valve body and a valve closure member on the valve stem engageable with said valve seat,
   i. an actuating handle on the valve stem for opening the valve by rotating the valve stem relative to the bonnet and valve body and thereby moving the valve closure member into engagement with the valve seat, and for closing the valve by rotating the valve stem in the opposite direction and thereby moving the valve closure member into engagement with the valve seat,
   j. the bonnet being provided with an annular flange and the valve body being provided with a tubular section coaxially aligned with said annular flange,
   k. said cover plate having an annular flange encircling the opening therein and extending coaxially between the annular flange of the bonnet and the tubular section of the valve body,
   l. said annular flange of the bonnet being seated on the annular flange of the cover plate and clamping said annular flange of the cover plate to the tubular section of the valve body when the bonnet is secured to the valve body, and
   m. a ratchet interlock between said annular flange of the bonnet and the annular flange of the cover plate oriented to allow the bonnet to be threaded into the valve body and to oppose threading the bonnet out of the valve body,
   n. said ratchet interlock comprising ratchet teeth formed on the underside of the annular flange of the bonnet and complementary ratchet-shaped sockets formed in the upper side of the annular flange of the cover plate,
   o. said ratchet-shaped sockets being recessed sufficiently to receive the ratchet teeth without disturbing the seating of the annular flange of the bonnet on the annular flange of the cover plate.

2. A faucet valve in accordance with claim 1, wherein:
   (a) the bonnet and cover plate are both made of molded plastics,
   (b) said plastics being sufficiently resilient to enable the ratchet teeth to cam past the ratchet shaped sockets while the bonnet is being threaded to the valve body, but being sufficiently rigid to lock the ratchet teeth to the ratchet shaped sockets to prevent threading the bonnet out of the valve body.

3. A faucet valve in accordance with claim 1, wherein:

(a) the valve closure member is a spherical ball mounted within a spherical socket formed in the valve stem,
(b) said spherical socket having an opening formed therein through which the spherical ball projects for engagement with the valve seat,
(c) the radius of curvature of the spherical socket exceeding the radius of curvature of the spherical ball to provide sufficient clearance for the spherical ball to float relative to the valve seat,
(d) whereby the spherical ball centers itself in relation to the valve seat when it is moved into engagement therewith by the valve stem.

* * * * *